United States Patent
Nishimura et al.

(10) Patent No.: US 12,172,242 B2
(45) Date of Patent: Dec. 24, 2024

(54) LEAD-FREE SOLDER ALLOY

(71) Applicant: NIHON SUPERIOR CO., LTD., Osaka (JP)

(72) Inventors: Takatoshi Nishimura, Tokyo (JP); Tetsuro Nishimura, Osaka (JP); Tetsuya Akaiwa, Osaka (JP)

(73) Assignee: Nihon Superior Co., Ltd., Osaka (JP)

( * ) Notice: Subject to any disclaimer, the term of this patent is extended or adjusted under 35 U.S.C. 154(b) by 609 days.

(21) Appl. No.: 17/297,966

(22) PCT Filed: Nov. 29, 2019

(86) PCT No.: PCT/JP2019/046910
§ 371 (c)(1),
(2) Date: May 27, 2021

(87) PCT Pub. No.: WO2020/111273
PCT Pub. Date: Jun. 4, 2020

(65) Prior Publication Data
US 2022/0105593 A1    Apr. 7, 2022

(30) Foreign Application Priority Data

Nov. 30, 2018 (JP) .................................. 2018-225416

(51) Int. Cl.
*C22C 13/00* (2006.01)
*B23K 35/26* (2006.01)
*B23K 103/08* (2006.01)

(52) U.S. Cl.
CPC ............ *B23K 35/262* (2013.01); *C22C 13/00* (2013.01); *B23K 2103/08* (2018.08)

(58) Field of Classification Search
CPC .................. C22C 13/00; B23K 35/262; B23K 2103/08; C22F 1/16
See application file for complete search history.

(56) References Cited

U.S. PATENT DOCUMENTS

2006/0045793 A1    3/2006  Sawamura et al.
2008/0159903 A1*   7/2008  Lewis ..................... C22C 13/00
                                                        420/560

FOREIGN PATENT DOCUMENTS

| JP | 2002-018589 A | 1/2002 |
| JP | 2006-61914 A | 3/2006 |
| JP | 2006-159225 A | 6/2006 |

OTHER PUBLICATIONS

Tomlinson, W. J., and A. Fullylove. "Strength of tin-based soldered joints." Journal of materials science 27 (1992): 5777-5782.*
Morris, Jim et al. "Equipment Impacts of Lead Free Wave Soldering," APEX 2003, pp. 1-9.

* cited by examiner

*Primary Examiner* — Jessee R Roe
(74) *Attorney, Agent, or Firm* — Fitch, Even, Tabin & Flannery LLP

(57) ABSTRACT

A lead-free solder alloy includes Ag in an amount of 0.3 to 4.0% by mass, Cu in an amount of 0.1 to 2.0% by mass, Fe in an amount of 0.005 to 0.05% by mass, Ni in an amount of 0.01 to 0.5% by mass, Ga in an amount of 0.001 to 0.1% by mass, and Sn as the balance.

12 Claims, 3 Drawing Sheets

FIG. 1
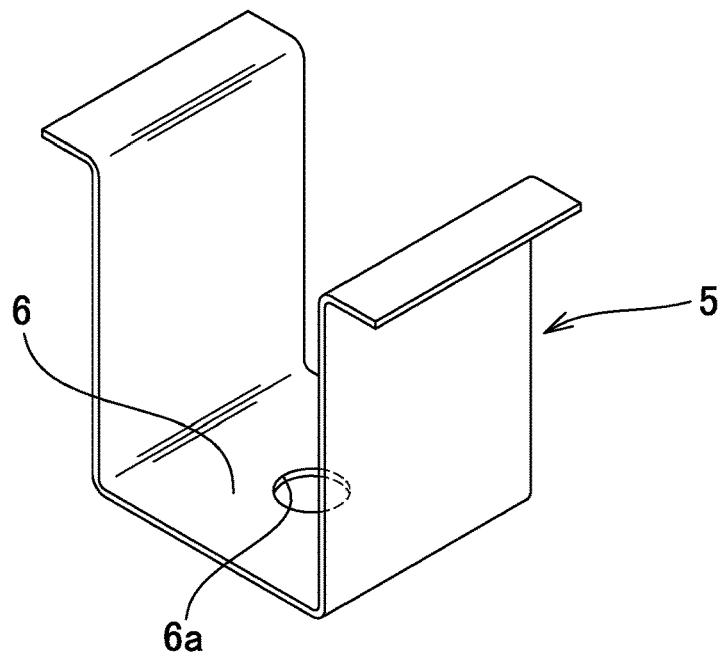
FIG. 2A
FIG. 2B
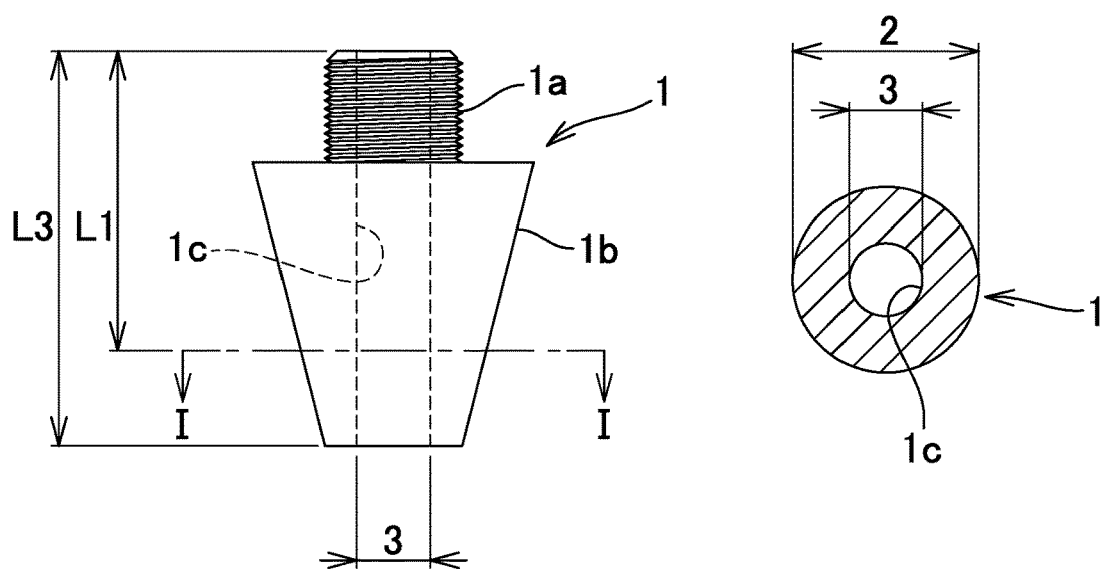

LEAD-FREE SOLDER ALLOY

CROSS-REFERENCE TO RELATED APPLICATIONS

This application is a U.S. national phase application filed under 35 U.S.C. § 371 of International Application No. PCT/JP2019/046910, filed Nov. 29, 2019 which is based upon and claims the benefit of priority from the prior Japanese Application No. 2018-225416, filed Nov. 30, 2018.

FIELD OF THE INVENTION

The present invention relates to a lead-free solder alloy and a joint joined using the same and, in particular, to a lead-free solder alloy having an effect of suppressing corrosion of a nozzle used for a spot soldering tank or the like used in soldering, for example, and a joint joined with the solder alloy.

BACKGROUND OF THE INVENTION

To reduce loads on the global environment, Sn—Ag—Cu-based lead-free solder alloys and Sn—Cu—Ni-based lead-free solder alloys have been widely spread as joining materials for electronic components. However, those lead-free solder alloys have a larger Sn content than Sn—Pb eutectic solder alloys and thus raise a problem of corrosion of dip soldering tanks and spot soldering tanks. To prevent such corrosion of dip soldering tanks and spot soldering tanks, techniques coating the surface of the soldering tanks with titanium or chromium have been developed. As to the solder alloys, in Sn-based lead-free solder alloys, lead-free solder alloys that can include elements such as "Fe" and "Co" have been developed.

Non Patent Literature 1 discloses a technique coating the surface of a stainless soldering tank with a thin chromium oxide alloy compound to enable it to have resistance to corrosion, for example. Patent Literature 1 discloses a technique removing arsenic included in molten solder to prevent a compound of arsenic and chromium as a cause of corrosion of a stainless soldering tank from being generated as a method for preventing corrosion of a soldering tank.

Patent Literature 2 discloses that a lead-free solder alloy including 0.005 to 0.2% by mass of Ga and the balance Sn can include Ag in an amount of 0.1 to 4% by mass, can include Cu and/or Sb in an amount of 3% by mass or less in total, and can include one or two or more selected from the group consisting of Ni, Co, Fe, Mn, Cr, and Mo in an amount of 0.5% by mass or less in total. In addition, it is stated that such a configuration can provide a solder alloy with improved solderability in lead-free solder with Sn as a main component, which generally has poor wettability.

CITATION LIST

Patent Literature

Patent Literature 1: Japanese Patent Application Laid-open No. 2006-159225
Patent Literature 2: Japanese Patent Application Laid-open No. 2002-18589

Non Patent Literature

Non Patent Literature 1: Jim Morris and Matthew J. O'Keefe. "Equipment Impact of Lead Free Wave Soldering" APEX2003 Best U.S. PaperAword

SUMMARY OF INVENTION

In recent years, there have been an increasing number of cases in which corrosion occurs in a nozzle used for a spot soldering tank, for example, stable injection of molten solder is made difficult, and faulty joining occurs.

However, the techniques disclosed in Non Patent Literature 1 and Patent Literature 1 and 2 do not disclose measures to prevent corrosion of the nozzle used for the spot soldering tank or the like at all, leaving a problem of corrosion of nozzles.

An object of the present invention is to provide a lead-free solder alloy that can suppress corrosion of a nozzle of a spot soldering tank, for example, and a joint joined with the solder alloy.

The inventors of the present invention have conducted earnest studies focusing on a lead-free solder alloy composition having excellent nozzle corrosion resistance in order to achieve the object, and found out that using a lead-free solder alloy including Sn, Ag, Cu, Fe, Ni, and Ga in specific amounts suppresses corrosion such as thinning of a nozzle used for a spot soldering tank or the like.

Specifically, a first aspect of the present invention relates to a lead-free solder alloy including Ag in an amount of 0.3 to 4.0% by mass, Cu in an amount of 0.1 to 2.0% by mass, Fe in an amount of 0.005 to 0.05% by mass, Ni in an amount of 0.01 to 0.5% by mass, Ga in an amount of 0.001 to 0.1% by mass, and Sn as the balance. The lead-free solder alloy can include inevitable impurities.

In an embodiment of the present invention, the lead-free solder alloy may serve to prevent corrosion of a nozzle of a spot soldering apparatus.

In an embodiment of the present invention, the lead-free solder alloy may further include at least one selected from Ge, P, Ti, Si, Mo, Zr, and Mn, in which a content of each of Ge, P, Ti, Si, Mo, Zr, and Mn is 0.001 to 0.1% by mass.

A second aspect of the present invention relates to a joint joined with the lead-free solder alloy described above.

The present invention can provide a lead-free solder alloy that can suppress corrosion of a nozzle used for a spot soldering tank, for example, and a joint joined with the solder alloy.

BRIEF DESCRIPTION OF DRAWINGS

FIG. 1 is a perspective view schematically illustrating a jig for use in Test Example 1.

FIG. 2A is a side view schematically illustrating a side face of a nozzle for use in Test Example 1, and FIG. 2B is a sectional view taken along the line I-I of FIG. 2A.

DESCRIPTION OF EMBODIMENTS

Figure 3:
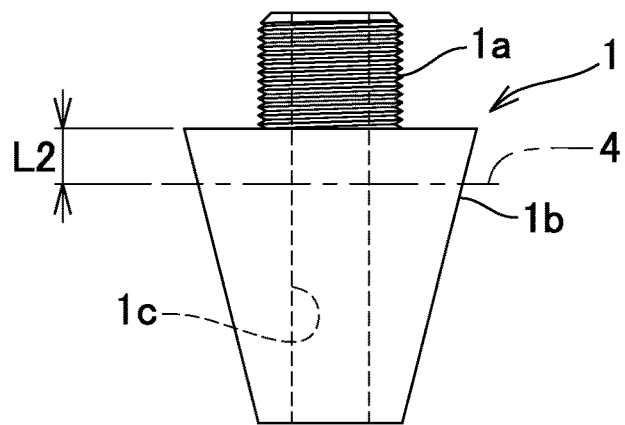
FIG. 3 is an illustrative diagram for indicating a position of the nozzle to be immersed in Test Example 1.

A lead-free solder alloy according to an embodiment of the present invention includes Ag in an amount of 0.3 to 4.0% by mass, Cu in an amount of 0.1 to 2.0% by mass, Fe in an amount of 0.005 to 0.05% by mass, Ni in an amount of 0.01 to 0.5% by mass, Ga in an amount of 0.001 to 0.1% by mass, and Sn as the balance.

Although it is known that Fe generally has an effect of preventing thinning of iron, it is also known that Fe reduces wettability. A nozzle used for a spot soldering tank, for example, is generally formed of metal or a metal alloy with iron or an iron group element as a main component, and thus when coming into contact with melt of a lead-free solder alloy with a higher content of Sn, the nozzle causes thinning of iron to corrode. Given these circumstances, it is considered that adding Fe as the lead-free solder alloy can suppress thinning of iron. Meanwhile, the nozzle used for the spot soldering tank, for example, is also required to keep a jet of solder constant, or in other words, to suppress what is called "turbulence" in the jet of the solder. To keep the jet of the solder constant, the wettability of the solder is required to be held. Thus, the solder alloy is also required to ensure wettability of the nozzle as well as prevention of thinning of the nozzle. In addition, to cope with spot soldering, ensuring of the fluidity of molten solder and prevention of dross are also required.

Given these circumstances, the inventors of the present invention have conducted earnest studies to make it possible to provide a lead-free solder alloy including Ag, Cu, Fe, Ni, and Ga in the above blending rates, and Sn as the balance (with inevitable impurities allowed) to cause the components to synergistically function, thereby (i) reducing thinning of the nozzle, (ii) holding the wettability of the solder to suppress turbulence in the jet of the solder to enable favorable solder joining, (iii) ensuring the fluidity of the molten solder, and (iv) enabling prevention of dross. The lead-free solder alloy has such characteristics and is thus suitable especially as a solder alloy used for a spot soldering apparatus. Although it is considered that Fe and Ni mainly contribute to (i) to (iii), and Ga mainly contributes to (iv), it is considered that these effects are exhibited more favorably by a synergistic effect of the components.

The content of Ag may be 0.3 to 4.0% by mass and is preferably 2.5 to 3.5% by mass.

The content of Cu may be 0.1 to 2.0% by mass and is preferably 0.5 to 1.0% by mass.

The content of Fe may be 0.005 to 0.05% by mass and is preferably 0.007 to 0.015% by mass.

The content of Ni may be 0.01 to 0.5% by mass and is preferably 0.03 to 0.1% by mass.

The content of Ga may be 0.001 to 0.1% by mass and is more preferably 0.005 to 0.01% by mass.

The lead-free solder alloy may include Ge, P, Ti, Si, Mo, Zr, and Mn, which each function as an antioxidant. One of these elements or two or more of them may be included. The contents of these elements are each preferably 0.001 to 0.1% by mass in view of causing them to function as the antioxidant as well as prevention of thinning of iron and ensuring of wettability. When metal elements functioning as the antioxidant are included, at least one element selected from Ge, P, Ti, Si, Mo, Zr, and Mn is preferably included in an amount of 0.001 to 0.1% by mass each.

The lead-free solder alloy can include inevitable impurities. However, even when inevitable impurities are included, the above effect can be produced.

The lead-free solder alloy described above (i) can suppress corrosion of the nozzle used for the spot soldering tank, for example, can thus reduce the frequency of replacing the nozzle, and thus has favorable soldering efficiency and can reduce costs, (ii) has favorable joining characteristics and can thus ensure favorable joining reliability of a solder joint, (iii) has favorable fluidity of molten solder and can suppress dross, thus has favorable solder drainage, easily comes into contact with a joining face, can suppress what is called a bridge and the exposure of a joining face such as copper land, and can ensure favorable joining reliability of the solder joint also due to this point, and (iv) can suppress dross and can thus improve the appearance quality of the joint and reduce costs.

A solder joint according to the embodiment of the present invention is formed using the lead-free solder alloy described above. More specifically, the solder joint joins an electrode terminal of an electronic component and an electrode terminal of a metallic wire or the like on a board together, for example, with the solder alloy described above. The solder joint is formed using the solder alloy described above and thus has favorable joining characteristics and favorable joining reliability especially when spot flow is performed using the nozzle used for the spot soldering tank or the like. In addition, the frequency of replacing the nozzle can be reduced, and thus soldering efficiency is favorable, and costs can be reduced.

The following describes the embodiment of the present invention with reference to examples.

EXAMPLES

Test Example 1

<Test Apparatus and Solder Alloy>
Tests were conducted with a test apparatus and on conditions described below.
Test Apparatus: TD-MHS-II type soldering apparatus manufactured by Tsunatori Electric Manufacturing Co., Ltd.
Used nozzle (made of cast iron treated with tin plating)
Soldering tank temperature: 320° C.

Example 1

Solder alloy composition: 96.435Sn-3.0Ag-0.5Cu-0.01Fe-0.05Ni-0.005Ga

Comparative Example 1

Solder alloy composition: 96.5Sn-3.0Ag-0.5Cu
<Method of Testing>
For a test, a length and an outer diameter of the nozzle illustrated in FIG. 2 were measured in advance, then the nozzle with the shape of FIG. 2 was fixed to the TD-MHS-II type soldering apparatus using the nozzle fixing jig illustrated in FIG. 1 so as to be immersed in molten solder up to a broken line 4 illustrated in FIG. 3, and the test was started on the conditions described above. Subsequently, the length and the outer diameter of the nozzle were measured after seven days, after 14 days, and after 21 days to calculate changes.

Figure 4:
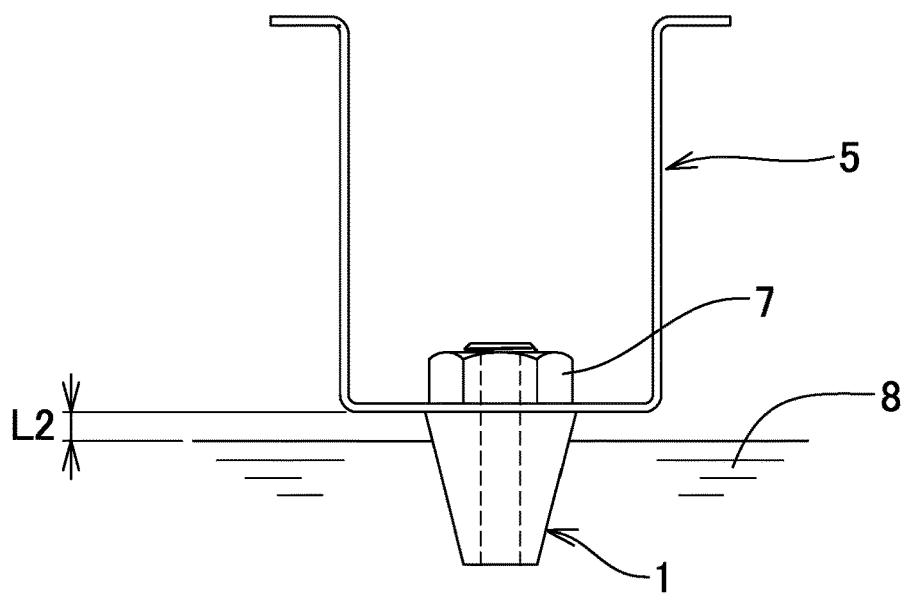
FIG. 4 is an illustrative diagram schematically illustrating a state in which the nozzle is immersed in molten solder in Test Example 1.

A detailed description is as follows with reference to FIGS. 1 to 4. As illustrated in FIG. 2, a nozzle 1 includes a fixing part 1*a* and a truncated conical nozzle part 1*b* tapered toward a distal end. The fixing part 1*a* protrudes from a basal end face of the nozzle part 1*b*. The nozzle 1 has a hollow part 1*c* extending linearly from its distal end toward its basal end to communicate with both ends. As illustrated in FIG. 4, the fixing part 1*a* is passed through a through hole 6*a* of a fixing jig 5 to be threadably engaged with a nut 7, and thus the nozzle 1 is fixed to the fixing jig. That is to say, a planar fixing place 6 provided with the through hole 6*a* is held between the nut 7 and the basal end face of the nozzle part 1b, whereby the nozzle 1 is fixed to the fixing jig 5. While the fixing jig 5 is grasped with a known grasping tool, the nozzle 1 is immersed in molten solder 8 from a distal end side of the nozzle part 1b of the nozzle 1 up to an immersion position 4 (refer to FIG. 3). As illustrated in FIGS. 3 and 4, the immersion position 4 is set such that a position with a height L2 from the basal end of the nozzle part 1b, that is, a face of the fixing part 6 closer to the nozzle part 1b is a liquid level of the molten solder 8. The length of the nozzle to be measured is a full length L3 of the nozzle. The outer diameter of the nozzle to be measured is an outer diameter 2 at a position with a length L1 from a basal end of the fixing part 1a of the nozzle 1 along a long-axial direction of the nozzle 1. The full length L3, L1, and L2 of the nozzle 1 at the beginning of the test are 29 mm, 22 mm, and about 5 mm, respectively.

Figure 5:
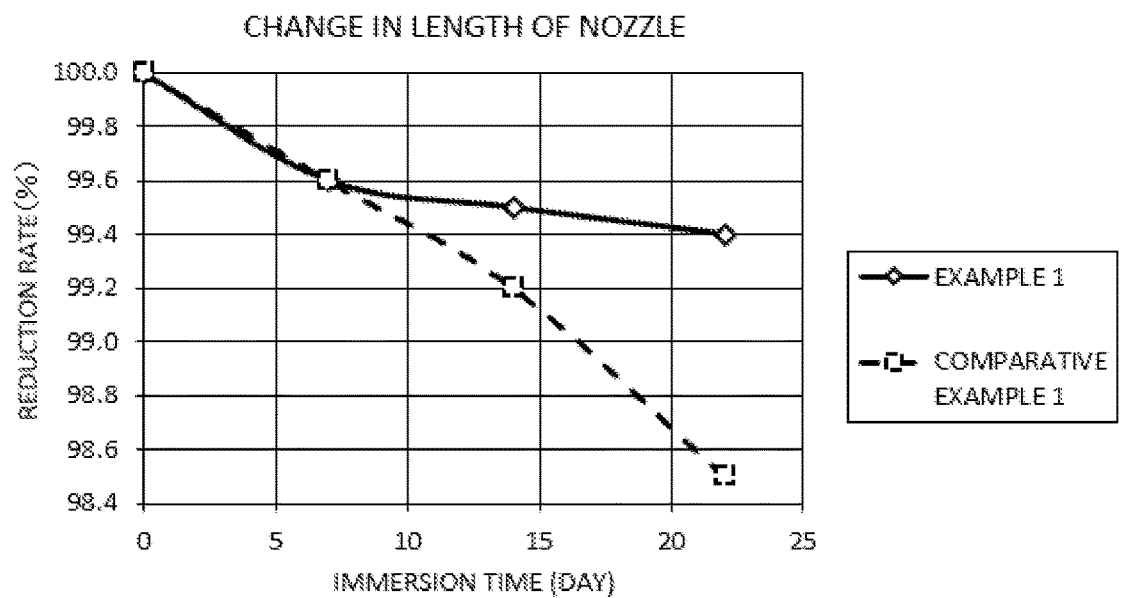
FIG. 5 is a diagram representing temporal changes in a length of the nozzle in Test Example 1.
Figure 6:
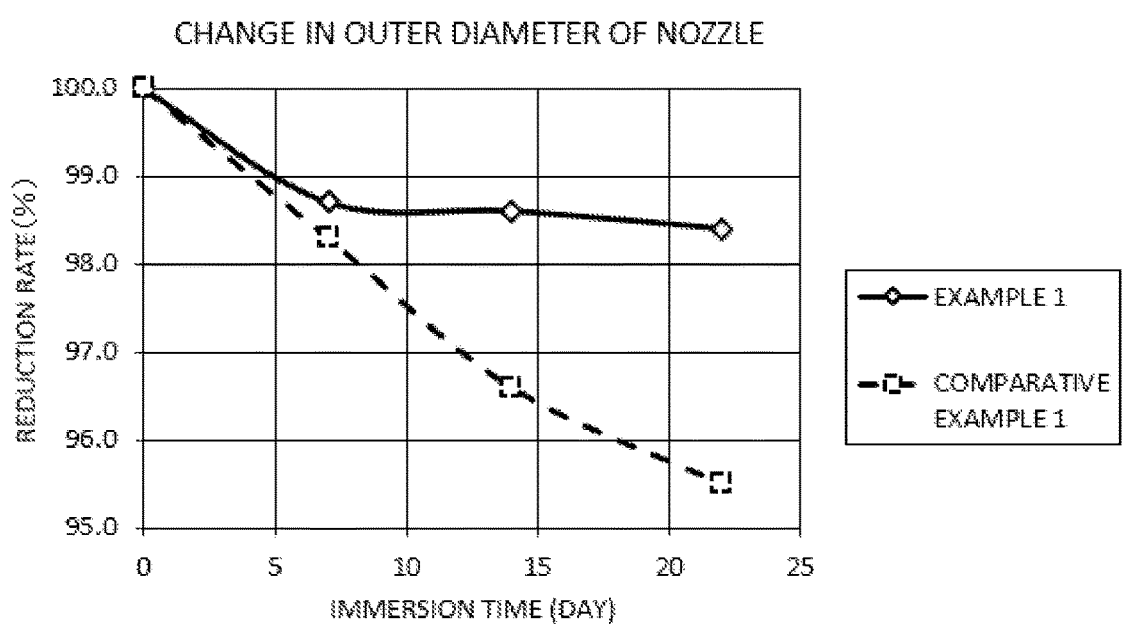
FIG. 6 is a diagram representing temporal changes in an outer diameter of the nozzle in Test Example 1.

Results are listed in Table 1 and Table 2 and illustrated in FIG. 5 and FIG. 6.

TABLE 1

| Immersion time | (Unit: day) | 0 | 7 | 14 | 21 |
|---|---|---|---|---|---|
| Example 1 | (%) | 100.0 | 99.6 | 99.5 | 99.4 |
| Comparative Example 1 | (%) | 100.0 | 99.6 | 99.2 | 98.5 |

TABLE 2

| Immersion time | (Unit: day) | 0 | 7 | 14 | 21 |
|---|---|---|---|---|---|
| Example 1 | (%) | 100.0 | 98.7 | 98.6 | 98.4 |
| Comparative Example 1 | (%) | 100.0 | 98.3 | 96.6 | 95.5 |

Table 1 lists changes in the length of the nozzle, whereas Table 2 lists changes in the outer diameter of the nozzle. FIG. 5 and FIG. 6 are graph representations of Table 1 and Table 2, respectively. FIG. 5 and FIG. 6 illustrate, with the length and the outer diameter of the nozzle before starting the test being 100, changes in the values obtained by measuring the length and the outer diameter for each immersion day as a percentage, and it is determined that a lower value indicates corrosion that has more progressed. It is revealed from these graphs that the lead-free solder alloy of Example 1 of the present invention shows smaller changes in the length and the outer diameter of the nozzle than those of the lead-free solder alloy of Comparative Example 1 and shows almost no reductions after the 7th day especially in the outer diameter. That is to say, these results clearly indicate that using the lead-free solder alloy according to the present invention suppresses corrosion of the nozzle.

A state of the molten solder after 21 days of the test was checked, and it was revealed that the lead-free solder alloy of Example 1 did not change color and showed almost no dross, whereas the lead-free solder alloy of Comparative Example 1 changed the color of the surface of the molten solder to yellow and showed a larger amount of dross than that of Example 1. It was visually revealed that the nozzle after the test had no exposed nozzle surface at a contact part with the molten solder. Further, when mounting was performed using the solder alloy of Example 1, there was no occurrence of what is called a "horn" in the appearance of the solder, and it was revealed that the fluidity of the molten solder was ensured.

Thus, the lead-free solder alloy according to Example 1 of the present invention shows less corrosion of the nozzle, ensures wettability, and can thus provide a highly reliable solder joint with favorable solder joining and, in addition, shows fewer color changes of the solder and less occurrence of dross and is thus a solder alloy extremely suitable for the spot soldering apparatus or the like.

Test Example 2

Flux (NS-65 manufactured by Nihon Superior Co., Ltd.) was applied to a thin piece (made of pure iron 10 mm wide×50 mm long×20 μm thick) corresponding to a nozzle, which was then plated with tin. The tin-plated thin piece was used as a test piece for the test below.

Lead-free solder alloys with compositions listed in Table (Examples 2 to 15 and Comparative Examples 2 to 4) were prepared, and about 1 kg of each of the lead-free solder alloys was charged into a soldering tank and was heated at 320° C. to prepare a molten lead-free solder alloy.

The test piece was fixed to a tip of a rod-like rotator of a screw type stirring apparatus (BL600 manufactured by Heidon), and the test pieces was immersed such that an immersion depth of the test piece was 40 mm. In this process, the rod-like rotator was rotated at 50 rpm with a central axis of the rod-like rotator in a length direction as a rotation axis. The central axis was inclined by 10° with respect to a liquid level of the molten solder. After a lapse of 120 minutes, an iron reduction rate was calculated with difference in area of an immersed part of the test piece before and after immersion as an iron eroded amount to evaluate a degree of corrosion (thinning of iron).

Measurement of the area of the immersed part of the test piece before and after immersion was performed with a digital microscope VHX-7000 manufactured by Keyence Corporation. The iron reduction rate was calculated as follows. Table 3 lists evaluation results. Criteria are "o" for an iron reduction rate of less than 5.0%, "Δ" for 5.0% or more and less than 10.0%, and "x" for 10.0% or more.

Iron reduction rate (%)=(area before immersion−area after immersion)/area to be immersed before immersion×100

TABLE 3

| | Composition (% by mass) | | | | | | | | | | | | | Iron reduction rate (%) | Determination of effect |
|---|---|---|---|---|---|---|---|---|---|---|---|---|---|---|---|
| Element | Sn | Ag | Cu | Fe | Ni | Ga | Ge | P | Ti | Si | Mo | Zr | Mn | | |
| Comparative Example 2 | Balance | 1.0 | 0.5 | — | 0.05 | 0.005 | — | — | — | — | — | — | — | 13.4 | x |
| Comparative Example 3 | Balance | 3.0 | 0.5 | 0.010 | — | — | — | — | — | — | — | — | — | 6.9 | Δ |
| Comparative Example 4 | Balance | 4.5 | 0.5 | 0.050 | 0.50 | 0.100 | — | — | — | — | — | — | — | 6.4 | Δ |

TABLE 3-continued

| Element | Composition (% by mass) | | | | | | | | | | | | | Iron reduction rate (%) | Determination of effect |
| --- | --- | --- | --- | --- | --- | --- | --- | --- | --- | --- | --- | --- | --- | --- | --- |
| | Sn | Ag | Cu | Fe | Ni | Ga | Ge | P | Ti | Si | Mo | Zr | Mn | | |
| Example 2 | Balance | 0.3 | 0.1 | 0.005 | 0.01 | 0.001 | — | — | — | — | — | — | — | 4.7 | ○ |
| Example 3 | Balance | 1.0 | 0.5 | 0.010 | 0.05 | 0.005 | — | — | — | — | — | — | — | 3.5 | ○ |
| Example 4 | Balance | 2.0 | 1.0 | 0.030 | 0.10 | 0.01 | — | — | — | — | — | — | — | 1.5 | ○ |
| Example 5 | Balance | 4.0 | 2.0 | 0.050 | 0.50 | 0.1 | — | — | — | — | — | — | — | 1.6 | ○ |
| Example 6 | Balance | 0.3 | 0.1 | 0.005 | 0.01 | 0.001 | 0.001 | 0.001 | 0.001 | 0.001 | 0.001 | 0.001 | 0.001 | 2.7 | ○ |
| Example 7 | Balance | 4.0 | 2.0 | 0.050 | 0.50 | 0.1 | 0.1 | 0.1 | 0.1 | 0.1 | 0.1 | 0.1 | 0.1 | 1.3 | ○ |
| Example 8 | Balance | 3.0 | 0.5 | 0.005 | 0.01 | 0.001 | 0.001 | — | — | — | — | — | — | 3.5 | ○ |
| Example 9 | Balance | 3.0 | 0.5 | 0.010 | 0.05 | 0.005 | — | 0.01 | — | — | — | — | — | 1.7 | ○ |
| Example 10 | Balance | 3.0 | 0.5 | 0.030 | 0.10 | 0.01 | — | — | 0.1 | — | — | — | — | 1.3 | ○ |
| Example 11 | Balance | 3.0 | 0.5 | 0.050 | 0.50 | 0.1 | — | — | — | 0.005 | — | — | — | 1.2 | ○ |
| Example 12 | Balance | 0.3 | 2.0 | 0.005 | 0.01 | 0.1 | — | — | — | — | 0.05 | — | — | 2.8 | ○ |
| Example 13 | Balance | 2.0 | 1.0 | 0.010 | 0.05 | 0.01 | — | 0.1 | — | — | — | 0.1 | — | 2.5 | ○ |
| Example 14 | Balance | 3.0 | 0.5 | 0.030 | 0.10 | 0.005 | — | — | 0.001 | — | — | — | 0.001 | 2.3 | ○ |
| Example 15 | Balance | 4.0 | 0.1 | 0.050 | 0.50 | 0.001 | 0.05 | — | — | 0.01 | — | — | — | 1.8 | ○ |

As listed in Table 3, the examples all have an iron reduction rate of 4.7% or less, whereas the comparative examples have a value of 6.4% or more, indicating that the examples can favorably suppress thinning of iron.

INDUSTRIAL APPLICABILITY

The lead-free solder alloy described above can suppress corrosion of a nozzle of a spot soldering apparatus, for example, in addition, provides favorable soldering characteristics, suppresses color changes of solder and the occurrence of dross, and can thus be expected to be widely applied to joining of electronic devices.

REFERENCE SIGNS LIST

1 NOZZLE USED FOR TEST EXAMPLE 1
1a FIXING PART
1b NOZZLE PART
1c HOLLOW PART
2 OUTER DIAMETER TO BE MEASURED OF NOZZLE USED FOR TEST Example 1
3 INNER DIAMETER OF NOZZLE USED FOR TEST EXAMPLE 1
4 SOLDER-IMMERSED POSITION OF NOZZLE USED FOR TEST Example 1
5 FIXING JIG FOR NOZZLE USED FOR TEST EXAMPLE 1
6 FIXING POSITION OF NOZZLE USED FOR TEST EXAMPLE 1
6a THROUGH HOLE
7 NUT
8 MOLTEN SOLDER
L1 LENGTH FROM BASAL END OF NOZZLE WITH OUTER DIAMETER TO BE MEASURED
L2 HEIGHT FROM BASAL END OF NOZZLE PART, THAT IS, FACE OF FIXING PLACE CLOSER TO NOZZLE PART TO LIQUID LEVEL OF MOLTEN SOLDER
L3 FULL LENGTH OF NOZZLE TO BE MEASURED

The invention claimed is:

1. A lead-free solder alloy consisting of:
   Ag in an amount of 0.3 to 4.0% by mass;
   Cu in an amount of 0.1 to 2.0% by mass;
   Fe in an amount of 0.005 to 0.05% by mass;
   Ni in an amount of 0.01 to 0.5% by mass;
   Ga in an amount of 0.005 to 0.1% by mass;
   at least one selected from P, Ti, Mo, Zr, and Mn, wherein a content of each of P, Ti, Mo, Zr, and Mn is 0.001 to 0.1% by mass; and
   Sn as a balance.

2. The lead-free solder alloy according to claim 1, wherein the lead-free solder alloy serves to prevent corrosion of a nozzle of a spot soldering apparatus.

3. A solder joint joined with the lead-free solder alloy according to claim 2.

4. The lead-free solder alloy according to claim 1, wherein at least one of Ti and Mo is presented in an amount of 0.001 to 0.1% by mass.

5. A solder joint joined with the lead-free solder alloy according to claim 1.

6. The lead-free solder alloy according to claim 1, wherein Ag is in an amount of 1.0 to 4.0% by mass.

7. A lead-free solder alloy consisting of:
   Ag in an amount of 0.3 to 4.0% by mass;
   Cu in an amount of 0.1 to 2.0% by mass;
   Fe in an amount of 0.005 to 0.05% by mass;
   Ni in an amount of 0.01 to 0.5% by mass;
   Ga in an amount of 0.005 to 0.1% by mass; and
   Sn as a balance.

8. A solder joint joined with the lead-free solder alloy according to claim 5.

9. A solder joint joined with the lead-free solder alloy according to claim 7.

10. The lead-free solder alloy according to claim 7, wherein the lead-free solder alloy serves to prevent corrosion of a nozzle of a spot soldering apparatus.

11. The lead-free solder alloy according to claim 7, wherein Ag is in an amount of 1.0 to 4.0% by mass.

12. The lead-free solder alloy according to claim 7, wherein Ag is in an amount of 3.0 to 4.0% by mass.

* * * * *